Figure 1:
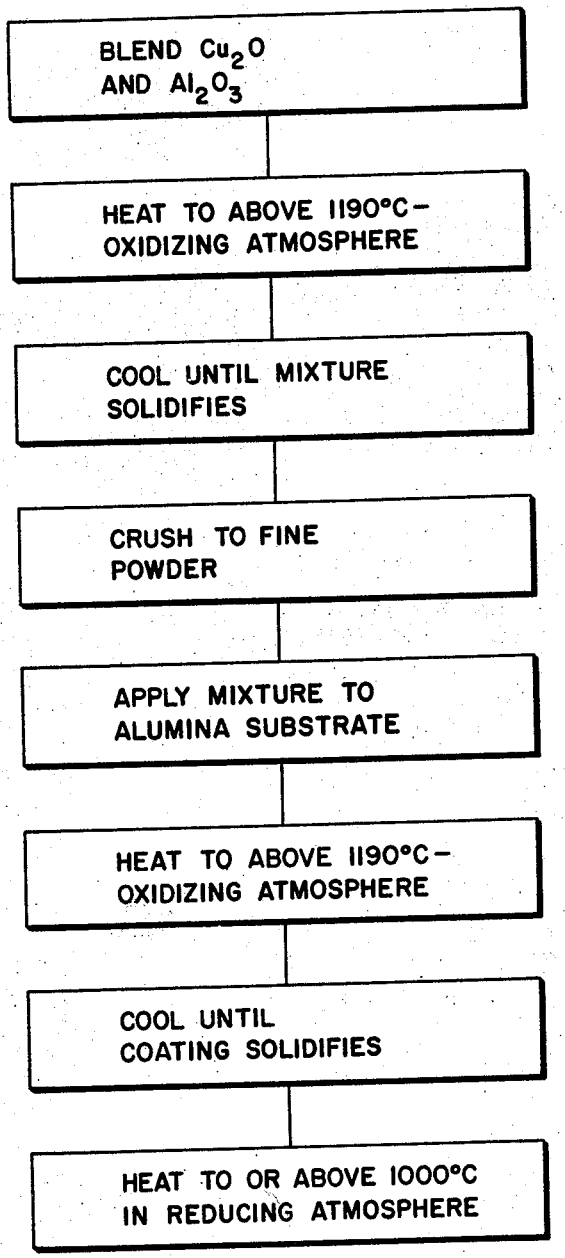

United States Patent Office 3,180,756
Patented Apr. 27, 1965

3,180,756
COPPER METALLIZING OF ALUMINA CERAMICS
Robert E. Cowan, Los Alamos, N. Mex., assignor to the United States of America as represented by the United States Atomic Energy Commission
Filed Sept. 7, 1962, Ser. No. 222,244
7 Claims. (Cl. 117—227)

The present invention relates to a metal-coated ceramic article and a process for producing the same. More particularly, the invention relates to a process for producing a copper coating on an alumina ceramic body that will be adherent, a good conductor of electricity and can be brazed easily.

The application of copper coating serves as a means for permitting soldering connections to be made between the ceramic body and a metal part when special requirements are present; for instance, when the connection should be absolutely vacuum tight, have great mechanical strength or when working at high temperature. Special requirements such as these are called for in the production of electrical discharge tubes and in applying thin ceramic cutting plates on metallic supports. The process of this invention will produce an article with a hermetic ceramic-to-metal seal useful in many electronic applications such as the production of a ceramic printed circuit board.

The novel copper-coated alumina ceramic of the present invention is formed by spreading and applying a thin layer of a eutectic mixture of cuprous oxide and aluminum oxide to the surface of the alumina ceramic, heating the mixture in an oxidizing atmosphere to a temperature which exceeds the melting point of the coating (1190° C.) and subsequently firing the article in a reducing atmosphere of approximately 1000° C. to form the adherent layer of copper metal.

There are several known processes for producing a metal coating on ceramic parts. For example, U.S. Patent 2,928,755, issued to Brandstädt et al., describes a method of producing such a metallic coating by applying a mixture consisting of copper, manganese and a flux of zirconium oxide to a ceramic surface and heating to a temperature of about 1400° C. This process entails several disadvantages not present in this invention. For instance this invention uses a lower firing temperature. Furthermore the coating of the prior process is relatively hard to dissolve away when making printed circuits. In addition, a pure copper coating possesses many advantages when used in electronic circuits.

Treptow et al. in "A Paste for Screen Printing and Firing Copper on Ceramic Bases," 39 Am. Cer. Soc. Bull. 453–455 (September 1960), describe a method of obtaining a copper coating on the ceramic face by applying a paste of cuprous oxide and glass to the ceramic and thereafter firing the article in a reducing atmosphere of nitrogen, hydrogen and a small, regulated amount of oxygen. The present invention also entails several advantages over this known method. The presence of glass decreases the solderability and conductivity of the resulting article. Furthermore the reducing atmosphere is difficult to maintain since a small regulated amount of oxygen is present and a relatively small increase in the amount of oxygen could well result in an explosion.

Accordingly, it is an object of the present invention to overcome the above-named shortcomings of known processes and to provide a process for producing an adherent copper coating on an alumina ceramic body that will be highly conductive, easily soldered, resistant to temperature changes and which will stand high mechanical stress.

It is a further object of this invention to provide a process for producing a copper coating on an alumina ceramic body which will make hermetic connection possible.

Other objects and advantages of the present invention will become apparent from the following detailed description.

FIGURE 1 is a flow sheet illustrating the method of preparing a copper coated alumina ceramic.

Figure 2:
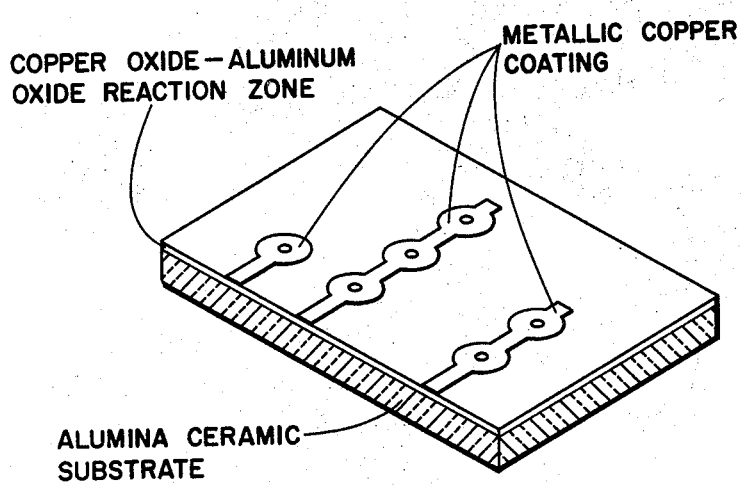

FIGURE 2 is a drawing of the copper coated alumina ceramic obtained by practicing the method illustrated in FIGURE 1. The particular article shown shows part of a ceramic printed circuit board. This is easily produced by placing a template over the ceramic surface before applying the $Cu_2O$-$Al_2O_3$ mixture.

A eutectic mixture of cuprous oxide and alumina is first prepared by dry blending 94.2 weight percent cuprous oxide and 5.8 weight percent aluminum oxide in powder form. The mixture need not be proportioned to give an exact eutectic mixture, but it is necessary to keep as close as possible in order to obtain all the benefits of this invention. In addition, the mixture need not be prepared by dry blending in powder form since any ordinary solvent would be volatilized in the initial steps of the process. The resulting mixture is then heated in an oxidizing atmosphere (such as air). In this particular embodiment a temperature of 1250° C. was used for a time of 30 minutes. However, a temperature above 1190° C. would be suitable and it even appears that a solid state reaction would occur above 1100° C. However, a greater soaking time would be required at the lower temperatures and it is deemed preferable to use a temperature of about 1250° C. The time of soaking is not critical, although any time in excess of 2 hours would fail to give appreciably better results. The mixture is then cooled to a temperature at which it solidifies, preferably to room temperature, and crushed to a small particle size. In the present embodiment the mixture was crushed to a particle size of approximately 200 mesh since the powder was then applied to the surface of the alumina ceramic by screening. If other application methods such as spraying or dipping were used it may be desirable to use a smaller particle size. At this point it should be noted that a printed circuit may be very easily produced by placing a template over the ceramic surface which will trace out the desired circuit. When the mixture is applied, it will fill the spaces left by the template and thereby form the desired circuit on the ceramic base. The thickness of the coating should be less than .005 inch and is preferably on the order of .001 inch. Above .005 inch it is found that the problem of thermal expansion differential becomes too severe for really satisfactory results. There is no requirement that the alumina ceramic be of high purity. It has been found that 85% alumina is sufficient.

The coated ceramic is then fired in an oxidizing atmosphere (such as air) to a temperature which exceeds the melting point of the coating (1190° C.). Again, a soaking time of 30 minutes was used, although this is not critical. A temperature of 1250° C. has been found to be satisfactory. During this firing treatment the $Cu_2O$-$Al_2O_3$ eutectic coating reacts with the $Al_2O_3$ body to a slight extent and forms an adherent layer. The coated ceramic is then fired in a reducing atmosphere which causes some of the cuprous oxide in the coating to be converted to copper metal. Any reducing atmosphere would be suitable and it has been found that firing in a hydrogen atmosphere at or above 1000° C. yields satisfactory results. As before, the soaking time of 30 minutes was used, but this time may be varied at will. The resulting structure is a ceramic body having an adherent layer of copper metal on its surface.

The process according to the invention offers the advantage that the metallization occurs far below the softening point of the alumina ceramic material. It is another important advantage that the process may be practiced with relatively simple equipment and safe and easily obtained atmospheres. The resulting product is highly conductive to electrical current and easily soldered to other metal pieces using a variety of solders including lead-tin soft solder. Printed circuits may be formed on the coated ceramic by common photographic-etching techniques.

It is apparent that the process described above, by relatively simple process steps, results in a highly useful and novel article.

What is claimed is:

1. A process of forming a copper coated alumina ceramic which comprises applying a thin layer of a mixture consisting essentially of $Cu_2O$ and $Al_2O_3$ so proportioned as to give about a eutectic mixture to the surface of an alumina ceramic, firing the resulting article in an oxidizing atmosphere to a temperature above about 1190° C. and subsequently firing in a reducing atmosphere above about 1000° C. to form an adherent copper layer on the ceramic surface.

2. A process as described in claim 1 wherein the $Cu_2O$ comprises about 94.2 weight percent and the $Al_2O_3$ about 5.8 weight percent of the mixture.

3. A process as described in claim 1 wherein the layer formed by the mixture does not exceed .005 inch.

4. The article produced by the method of claim 1.

5. A process of forming a copper coated alumina ceramic which comprises applying a thin layer of a mixture consisting of $Cu_2O$ and $Al_2O_3$ so proportioned as to give about a eutectic mixture to the surface of an alumina ceramic, firing the resulting article in an oxidizing atmosphere to a temperature above about 1190° C. and subsequently firing in a reducing atmosphere above about 1000° C. to form an adherent copper layer on the ceramic surface.

6. A process as described in claim 5 wherein the $Cu_2O$ comprises about 94.2 weight percent and the $Al_2O_3$ about 5.8 weight percent of the mixture.

7. A process as described in claim 5 wherein the layer formed by the mixture does not exceed .005 inch.

References Cited by the Examiner

UNITED STATES PATENTS

| | | | |
|---|---|---|---|
| 2,733,161 | 1/56 | Lytton et al. | 117—123 |
| 2,776,472 | 1/57 | Mesick | 29—473.1 |
| 2,993,815 | 7/61 | Treptow | 117—227 |
| 3,124,478 | 3/64 | Cirkler et al. | 117—227 |

FOREIGN PATENTS

| | | |
|---|---|---|
| 855,625 | 12/60 | Great Britain. |
| 157,052 | 6/54 | Australia. |

RICHARD D. NEVIUS, *Primary Examiner.*